United States Patent [19]

Yokoyama

[11] Patent Number: 5,410,751

[45] Date of Patent: Apr. 25, 1995

[54] CONTROLLING MUTING, HIGH FREQUENCY COMPONENTS AND BLENDING TO REDUCE FM NOISE

[75] Inventor: Ryoichi Yokoyama, Tokyo, Japan

[73] Assignee: NEC Corporation, Tokyo, Japan

[21] Appl. No.: 940,362

[22] Filed: Sep. 3, 1992

[30] Foreign Application Priority Data

Sep. 5, 1991 [JP] Japan .................................. 3-225553

[51] Int. Cl.⁶ ............................................. H04B 1/10
[52] U.S. Cl. ................................... 455/212; 455/222; 455/303; 455/307; 455/312; 381/13
[58] Field of Search ................ 455/10, 523, 212, 213, 455/218, 219, 220, 221, 222, 223, 224, 225, 235.1, 245.1, 246.1, 247.1, 251.1, 296, 297, 295, 311, 303, 306, 307, 312; 381/10, 11, 12, 13, 94; 375/104

[56] References Cited

U.S. PATENT DOCUMENTS

| | | | |
|---|---|---|---|
| 3,873,926 | 3/1975 | Wright | 455/225 |
| 4,143,325 | 3/1979 | Kahn | 455/221 |
| 4,388,731 | 6/1983 | King | 455/221 |
| 4,620,315 | 10/1986 | Imagawa | 381/13 |
| 4,833,715 | 5/1989 | Sakai | 381/13 |
| 4,914,715 | 4/1990 | Miyata | 455/221 |
| 5,036,543 | 7/1991 | Ueno | 381/13 |
| 5,201,062 | 4/1993 | Nakamura et al. | 381/10 |
| 5,253,299 | 10/1993 | Ishida et al. | 381/13 |

FOREIGN PATENT DOCUMENTS

| | | | |
|---|---|---|---|
| 1-255331 | 10/1989 | Japan | 381/13 |
| 1256829 | 10/1989 | Japan | 381/13 |
| 2170735 | 7/1990 | Japan | 381/13 |

OTHER PUBLICATIONS

NEC, Bipolar Analog Integrated Circuit uPC1348, 1989.
Philips Components, ICs for Electronically Tuned Car Radios, Aug., 1989.

Primary Examiner—Reinhard J. Eisenzopf
Assistant Examiner—Nguyen Vo
Attorney, Agent, or Firm—Leydig, Voit & Mayer

[57] ABSTRACT

An FM noise reduction circuit including a level detection circuit receiving an intermediate frequency signal. The level detection circuit rectifies the intermediate frequency signal, and outputs a rectified intermediate frequency signal. A first frequency filter passes the rectified intermediate frequency signal in a first frequency range, and outputs a first voltage responsive to the portion of the rectified intermediate frequency signal passed in the first frequency range. A first interference signal detection circuit includes a second frequency filter. The second frequency filter passes the rectified intermediate frequency signal in a second frequency range and outputs a second voltage responsive to the portion of the rectified intermediate frequency signal passed in the second frequency range. The second interference signal detection circuit includes a third frequency filter. The third frequency filter passing the rectified intermediate frequency signal in a third frequency range, and outputs a third voltage responsive to the portion of the rectified intermediate frequency signal passed in the third frequency range. The first, second, and third frequency ranges are different. A control circuit controls muting, high frequency components, and blending of a demodulated audio output responsive to the first, second, and third voltages, to reduce FM noise.

20 Claims, 2 Drawing Sheets

CONTROLLING MUTING, HIGH FREQUENCY COMPONENTS AND BLENDING TO REDUCE FM NOISE

BACKGROUND OF THE INVENTION

This invention relates to an FM stereo receiver, especially noise reduction circuits of the FM stereo receiver for cars.

A conventional FM noise reduction circuit, as shown in FIG. 2, includes an intermediate frequency amplification circuit 1 (IF amplifier, hereafter), including an intermediate frequency input 18, the level detection circuit 9 (level detector) to rectify IF signals from the IF amplifier 1 and output the rectified IF signals into the low pass filter 10 (LPF) and high pass filter 31 (HPF), the muting circuit 4 to attenuate a stereo composite signal demodulated by the FM detection circuit 2 and output by noise control (N.C.) circuit 3 depending on the output signal (roughly the direct current only) of LPF 10, the rectification circuit 33 to rectify the output (composed of the alternating current only) of HPF 31, LPF 35 to smooth the output of rectification circuit 33, the adder 17 to subtract the output of LPF 35 from the output of LPF 10, the high cut control circuit 6 (HCC circuit) to attenuate the high frequency components of MAIN signal (L+R) in the composite signal and the stereo noise control circuit 7 (SNC circuit) to control the stereo blend quantity by attenuating the SUB signal (L−R) in the same composite signal controlled respectively by the output of the adder 17, and the multiplex demodulation circuit 8 (MPX circuit) to demodulate the stereo audio signal L and R from the composite signal processed respectively by going through the above muting circuit 4, HCC circuit 6, and SNC circuit 7. Left and right output channels 18, 19 output the demodulated stereo audio signal.

These operations are broadly divided into suppression of noise increment in the stereo demodulation output by the FM demodulation noise with the input signal lowering under the weak electric field and reduction of a multi-pass distortion and multi-pass noise by a mutual interference of the direct wave and reflecting wave. First of all, as for the former, in the weak electric field the C/N ratio decreases at the high frequency amplification circuit input, because of the lowering of the input signal level from the antenna. The FM demodulation noise voltage, therefore, increases at the output of FM detection circuit 2 in inverse proportion to the antenna input level. When the IF input signal goes down to or below the set threshold value, the SNC circuit 7 controlled by the first direct current voltage of the output of LPF 10 in proportion to the IF input signal level (i.e., in proportion to the antenna input level) attenuates the SUB signal frequency band on the composite signal and suppresses the noise increment on the demodulation stereo signal. In addition, when the IF input level goes down, the high frequency component of MAIN signal (L+R) is attenuated by the HCC circuit 6, moreover the noise increment is suppressed. With the operation of these HCC circuit 6 and SNC circuit 7 the S/N ratio of demodulation audio signal in the weak electric field is ensured till the limit. And when it turns to the weak electric field, the IF signal input level goes down and is below the limiting sensitivity of IF amplifier, the FM demodulation noise radically increases and it is very offensive to the ear. To solve this problem, all FM demodulation output signals including L+R MAIN signal are attenuated by the muting circuit 4.

Next, it describes about the latter, the reduction of multi-pass distortion and multi-pass noise. When there is a multi-pass, the multi-pass distortion or the multi-pass noise occurs to the demodulated output by the interference of a direct wave and indirect wave. This noise of distortion remarkably appears in the high frequency component of the FM demodulation output, L−R SUB signal band and L+R MAIN signal high frequency, so that, when there is the multi-pass, the multi-pass noise and distortion appeared in the demodulated stereo signal can be reduced by the process with the SNC circuit 7 and the HCC circuit 6, which process is performed by the following interference detection means. When there is the multi-pass and that frequency is modulated (FM), the instant relative phases of reflecting wave and direct wave are changed by the instantaneous value of modulation signal, so the AM modulation occurs by the mutual interference to the total antenna input signals of the reflecting wave and the direct wave. Therefore, the alternating current component is multiplied to the output of level detector 9, so the second direct current voltage will be obtained by abstracting it with the HPF 31, rectifying it with the all wave rectifier 33, and smoothing it with the LPF 35. Then adder 17 subtracts the second direct current voltage from the first direct current voltage, and the output of adder 17 controls and the HCC and SNC circuits. In other words, the HCC and SNC circuits are controlled as same as the weak electric field when there is the multi-pass.

The FM noise reduction circuit, as described above, is essential to the FM receiver for cars when the electric field strength is frequently changed by influences of buildings and so forth. With a mobile receiver, multi-pass interference frequently occurs.

Now in the conventional FM noise reduction circuit, when the multi-pass interference is extremely serious, that is, the level between direct wave and reflecting wave is close and the delay time is comparatively long, the distortion or noise reached to the reduction of L+R MAIN signal and can not be processed by the HCC and SNC circuits, the far bigger noise is replaced than the demodulation signal by the usual modulation, and it is extremely offensive to the ear.

More, in the conventional technique (NEC electric device, the reference No. IP-8019, November, 1989) as well, the HCC circuit and SNC circuit are only offered for the reduction of multi-pass noise and distortion, and when the multi-pass interference is extremely serious the far bigger noise is replaced than the demodulation signal, and it is inconvenient.

Further, there is the technique as mentioned in ICs for electrically tuned car radios (August, 1989, pp 1–20, Phillips Components) other than that, but when the multi-pass interference is extremely serious the far bigger noise is replaced than the demodulation signal, and it is inconvenient.

SUMMARY OF THE INVENTION

The object of this invention is to offer a technique to suppress the noise, with the demodulation signal even when the multi-pass interference is serious.

The object of this invention is achieved by an FM noise reduction circuit with means to extend the interference detection means, control the muting circuit by this output, and attenuate the demodulation signal.

In one aspect of the invention, the above object may be achieved by an FM noise reduction circuit including an intermediate frequency signal level detection circuit mechanism for obtaining a first direct current (DC) voltage corresponding to an intermediate frequency signal level by rectifying an output of an intermediate frequency signal amplification circuit. A first interference signal level detection mechanism outputs a second DC voltage corresponding to a multi-pass signal level and a neighboring interference office signal level by rectifying and smoothing components of an alternating current signal to weight with said first DC voltage. A second interference signal level detection mechanism outputs a third DC voltage corresponding to the interference signal level by rectifying and smoothing components of the alternating current signal. A mechanism is provided for controlling attenuation of a demodulation audio output of said FM radio receiver by said first, second, and third DC voltages, for controlling attenuation of high frequency components of the demodulation audio output and for controlling a blending quantity between right and left channels by said first and second DC voltage.

In addition, it is desirable that individually different detection sensitivities are given to said first and second interference signal level detection means.

More, it is desirable that a maximum quantity of attenuation in controlling by said first direct current voltage and a maximum quantity of attenuation in controlling by said third direct current voltage is differentiated in said attenuation operation of said demodulation audio output.

More, it is desirable that said first interference signal level detection means is comprised of a medium pass filter, an all wave rectifier, and a low pass filter, and said second interference signal level detection means is comprised of a high pass filter, an all wave rectifier, and a low pass filter.

More, it is desirable that said second interference signal level detection sensitivity is set lower than said first interference signal level detection sensitivity using the gains of a high pass filter and low pass filter in said second interference signal level detection means.

More, it is desirable that said second interference signal level detection sensitivity is set lower than said first interference signal level detection sensitivity using a rectification efficiency of the all wave rectifier in said second interference signal level detection means.

More, it is desirable that said second interference signal detection sensitivity is set lower than said first interference signal level detection sensitivity, depending on a passband of the high pass filter in said second interference signal level detection means.

More, it is desirable to be comprised to differentiate the maximum quantities of attenuation in controlling by said first direct current voltage and said third direct current voltage by making a new muting circuit to enable to set individually the maximum quantity of attenuation in controlling by the above third direct current voltage.

DETAILED DESCRIPTION OF THE INVENTION

The following describes the invention referring the figures.

Figure 1:
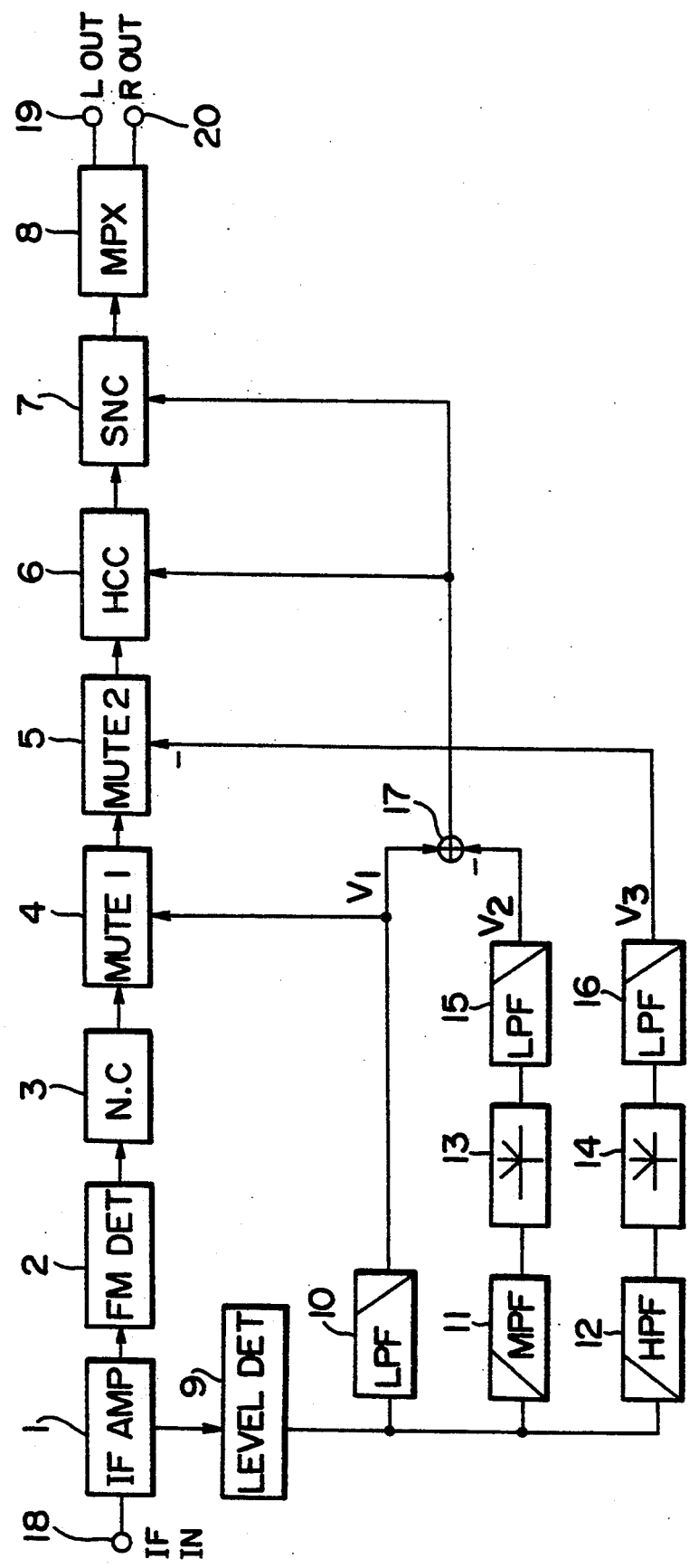
FIG. 1 is a block diagram of an implement of the invention.
Figure 2:
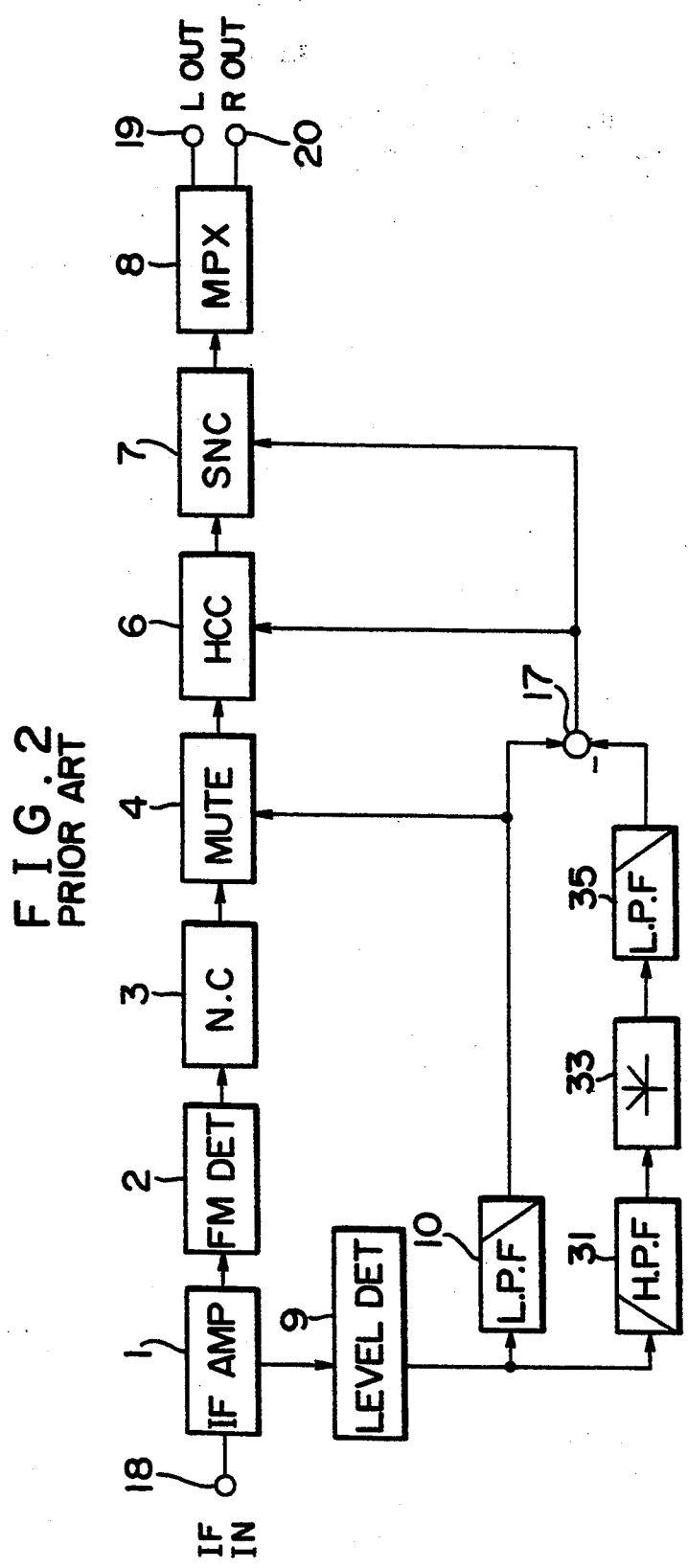
FIG. 2 is a block diagram of an FM noise reduction circuit of a conventional FM stereo receiver.

FIG. 1 is a block diagram of an implement of the invention. A medium pass filter (MPF) 11, rectification circuit 13, and low pass filter (LPF) 15 form a medium pass interference detection path. The HPF 12, all wave rectifier circuit 14, LPF 16 and the second muting circuit 5 are extended as the second interference signal detection means, compared to the conventional example shown in FIG. 2. Therefore when the multi-pass interference occurs, the whole demodulation outputs including MAIN signal can be attenuated by the muting circuit 5. Here it is desirable that this attenuation operation is performed only when the multi-pass interference is extremely serious. In other words for the light multi-pass interference it is sufficient by the process of SNC or HCC, and the demodulation operation of MAIN signal should be ensured till the limit. Now the degree of AM demodulation of IF signal comes high depending on the degree of the multi-pass interference, so that it is all right if the sensitivity of the second interference detection means is set low. Otherwise it is inconvenient that the MAIN signal is frequently attenuated by the light multi-pass frequently occurred. The sensitivity of detection can be set by the gains of HPF 12 and LPF 16, the rectification efficiency of all wave rectifier circuit 14, and the passband of HPF 12. Also the muting circuit 4 in FIG. 1 is to reduce the FM demodulation noise at a weak electric field or inputting nothing, but the maximum quantity of attenuation is not necessarily a suitable maximum quantity of it at when the multi-pass occurs, so that the maximum quantity of attenuation is designed to enable to be individually set by setting up the new muting circuit 5.

As described above this invention is comprised to attenuate the whole demodulation outputs including MAIN signal when the serious multi-pass interference occurs, so that it is very effective to the improvement of quality of receiver on practical and auditory sensitivity because no multi-pass noise that is bigger than the signal by the usual modulation and extremely offensive to the ear is output. In addition as AM modulation occurs in an IF signal even if there is a neighboring office interference in the receiving band, the same effect can be obtained against the distortion and noise in offensive to the ear that occurs when the interference is serious and the signal level between the expecting office and the neighboring office is extremely close.

What is claimed is:

1. An FM noise reduction circuit for use in an FM radio receiver including an intermediate frequency signal amplification circuit, the FM noise reduction circuit comprising:
   intermediate frequency signal level detection circuit means for obtaining a first direct current (DC) voltage corresponding to an intermediate frequency signal level by rectifying an output of the intermediate frequency signal amplification circuit;
   first interference signal level detection means to obtain a second DC voltage corresponding to a multi-pass signal level and a neighboring interference office signal level by rectifying and smoothing components of an alternating current signal of the output of the intermediate frequency signal amplification circuit to weight with said first DC voltage;

second interference signal level detection means to obtain a third DC voltage corresponding to an interference signal level by rectifying and smoothing components of the alternating current signal; and means for controlling attenuation of a demodulation audio output of said FM radio receiver by said first and third DC voltages, for controlling attenuation of high frequency components of the demodulation audio output and for controlling a blending quantity between right and left channels by said first and second DC voltages.

2. The FM noise reduction circuit as set forth in claim 1 wherein said first and second interference signal level detection means have different detection sensitivities.

3. The FM noise reduction circuit as set forth in claim 1 wherein said first interference signal level detection means includes a medium pass filter, an all wave rectifier, and a low pass filter, and said second interference signal level detection means includes a high pass filter, an all wave rectifier, and a low pass filter.

4. The FM noise reduction circuit as set forth in claim 1 wherein said second interference signal level detection means has a lower sensitivity than said first interference signal level detection means, the second interference signal level detection means including a high pass filter and a low pass filter, the sensitivity of the second interference signal level detection means being determined by gains of the high pass filter and the low pass filter.

5. The FM noise reduction circuit as set forth in claim 1 wherein said second interference signal level detection means includes an all wave rectifier, a sensitivity of the second interference signal level detection means being set lower than a sensitivity of said first interference signal level detection means by a rectification efficiency of said all wave rectifier in said second interference signal level detection means.

6. The FM noise reduction circuit as set forth in claim 1 wherein said second interference signal detection means includes a high pass filter, a sensitivity of the second interference signal detection means being set lower than a sensitivity of said first interference signal level detection sensitivity, depending on a passband of the high pass filter in said second interference signal level detection means.

7. The FM noise reduction circuit as set forth in claim 1 wherein a maximum quantity of attenuation controlled by said first DC voltage and a maximum quantity of attenuation controlled by said third DC voltage are differentiated.

8. The FM noise reduction circuit as set forth in claim 1 including a muting circuit to differentiate a maximum quantity of attenuation controlled by said first DC voltage and said third DC voltage by adjusting the maximum quantity of attenuation controlled by the third DC voltage.

9. The FM noise reduction circuit as set forth in claim 2 wherein said second interference signal level detection means has a lower sensitivity than said first interference signal level detection means, the second interference signal level detection means including a high pass filter and a low pass filter, the sensitivity of the second interference signal level detection means being determined by gains of the high pass filter and the low pass filter.

10. The FM noise reduction circuit as set forth in claim 2 wherein said second interference signal level detection means includes an all wave rectifier, a sensitivity of the second interference signal level detection means being set lower than a sensitivity of said first interference signal level detection means by a rectification efficiency of said all wave rectifier in said second interference signal level detection means.

11. The FM noise reduction circuit as set forth in claim 2 wherein said second interference signal detection means includes a high pass filter, a sensitivity of the second interference signal detection means being set lower than a sensitivity of said first interference signal level detection sensitivity, depending on a passband of the high pass filter in said second interference signal level detection means.

12. The FM noise reduction circuit as set forth in claim 2 including a muting circuit to differentiate a maximum quantity of attenuation controlled by said first DC voltage and said third DC voltage by adjusting the maximum quantity of attenuation controlled by the third DC voltage.

13. The FM noise reduction circuit as set forth in claim 7 including a muting circuit to differentiate a maximum quantity of attenuation controlled by said first DC voltage and said third DC voltage by adjusting the maximum quantity of attenuation controlled by the third DC voltage.

14. An FM noise reduction circuit for controlling muting, high frequency components, and blending to reduce FM noise, the FM noise reduction circuit comprising:

a level detection circuit, receiving an intermediate frequency signal, rectifying the intermediate frequency signal, and outputting a rectified intermediate frequency signal;

a first frequency filter coupled to the level detection circuit and receiving the rectified intermediate frequency signal, passing the rectified intermediate frequency signal in a first frequency range, outputting a first voltage responsive to a portion of the rectified intermediate frequency signal passed in the first frequency range;

a first interference signal detection circuit including a second frequency filter coupled to the level detection circuit and receiving the rectified intermediate frequency signal, passing the rectified intermediate frequency signal in a second frequency range and outputting a second voltage responsive to a portion of the rectified intermediate frequency signal passed in the second frequency range; and a second interference signal detection circuit including a third frequency filter coupled to the level detection circuit and receiving the rectified intermediate frequency signal, passing the rectified intermediate frequency signal in a third frequency range, and outputting a third voltage responsive to a portion of the rectified intermediate frequency signal passed in the third frequency range, wherein the first, second, and third frequency ranges are different; and a control circuit, responsive to the first, and third voltages, for controlling muting, and for attenuating high frequency components, and the control circuit being responsive to the first and second voltages for controlling blending of a demodulated audio output wherein FM noise is reduced.

15. The FM noise reduction circuit of claim 14 wherein the first, second, and third voltages are direct current (DC) voltages, the first interference signal detection circuit includes a first rectification circuit and a first low pass filter coupled in series with the second frequency filter, the second interference signal detection circuit includes a second rectification circuit and a second low pass filter coupled in series with the third frequency filter, and the control circuit attenuates a demodulation audio output and selected high frequency components of the demodulation audio output, responsive to the first, second, and third voltages, and the control circuit controls blending between right and left channels responsive to the first and second voltages.

16. The FM noise reduction circuit of claim 15 wherein the first frequency filter is a low pass filter, the second frequency filter is a medium pass filter, and the third frequency filter is a high pass filter.

17. The FM noise reduction circuit of claim 16 wherein the first and second interference signal level detection circuits have first and second signal level detection sensitivities, the first signal level detection sensitivity being different from the second signal level detection sensitivity.

18. The FM noise reduction circuit of claim 17 wherein the second interference signal level detection sensitivity is set lower than the first interference signal level detection sensitivity.

19. The FM noise reduction circuit of claim 14 wherein the control circuit includes:
 a first attenuation circuit coupled to the first frequency filter, attenuating a stereo composite signal responsive to the first voltage;
 a second attenuation circuit coupled to the first attenuation circuit and to the third frequency filter, attenuating the attenuated stereo composite signal responsive to the third voltage for eliminating multi-pass interference; and
 a third attenuation circuit coupled to the first and second attenuation circuits attenuating high frequency components of the stereo composite signal responsive to both the first voltage and the second voltage.

20. An FM noise reduction circuit for controlling muting, high frequency components, and blending to reduce FM noise, the FM noise reduction circuit comprising:
 intermediate frequency signal level detection circuit means for rectifying an intermediate frequency signal of an FM radio receiver to obtain a first direct current (DC) voltage corresponding to an intermediate frequency signal level;
 first interference signal detection means for rectifying and smoothing first selected frequency components of an alternating current signal of the intermediate frequency signal to obtain a second DC voltage corresponding to a multi-pass signal level and a neighboring interference office signal;
 second interference signal level detection means for rectifying and smoothing second selected frequency components of the alternating current signal to obtain a third DC voltage corresponding to an interference signal level; and
 control means for attenuating a demodulation audio output and high frequency components of the demodulation audio output responsive to the first and third DC voltages and for controlling blending between right and left channels responsive to the first and second DC voltages.

* * * * *